US008328538B2

(12) United States Patent
Smits

(10) Patent No.: US 8,328,538 B2
(45) Date of Patent: Dec. 11, 2012

(54) BALANCED DUAL ROCKING PISTON PUMPS

(75) Inventor: Troy Smits, Benton Harbor, MI (US)

(73) Assignee: Gast Manufacturing, Inc., a Unit of IDEX Corporation, Benton Harbor, MI (US)

( * ) Notice: Subject to any disclaimer, the term of this patent is extended or adjusted under 35 U.S.C. 154(b) by 265 days.

(21) Appl. No.: 11/776,310

(22) Filed: Jul. 11, 2007

(65) Prior Publication Data

US 2009/0016913 A1    Jan. 15, 2009

(51) Int. Cl.
    *F04B 27/02*    (2006.01)
(52) U.S. Cl. ........................................ 417/415
(58) Field of Classification Search ............ 417/534, 417/434, 521, 415, 418, 419, 221, 212, 215; 74/589, 87, 603; 92/72, 150, 152
    See application file for complete search history.

(56) References Cited

U.S. PATENT DOCUMENTS

| | | | | |
|---|---|---|---|---|
| 2,134,958 A * | 11/1938 | Shuholm | ......................... | 417/265 |
| 2,871,795 A * | 2/1959 | Smith | ........................... | 417/534 |
| 3,406,636 A * | 10/1968 | Olson, Jr. | ....................... | 417/534 |
| 3,563,677 A * | 2/1971 | Retan | ........................... | 417/415 |
| 3,583,642 A | 6/1971 | Crowell et al. | | |
| 3,744,261 A * | 7/1973 | Lagodmos | ........................ | 62/6 |
| 3,839,946 A * | 10/1974 | Paget | ............................. | 92/153 |
| 3,871,793 A * | 3/1975 | Olson, Jr. | ....................... | 417/273 |
| 3,878,768 A * | 4/1975 | Kress | ............................... | 92/2 |
| 4,132,510 A * | 1/1979 | Takahashi | ....................... | 417/534 |
| 4,373,876 A * | 2/1983 | Nemoto | .......................... | 417/534 |
| 4,494,447 A * | 1/1985 | Sisk | ............................... | 92/13.3 |
| 4,498,372 A * | 2/1985 | Pareja | ............................ | 92/187 |
| 4,679,994 A * | 7/1987 | Brown | ........................... | 417/525 |
| 5,011,383 A * | 4/1991 | Bennitt | ........................... | 417/534 |
| 5,222,877 A * | 6/1993 | Benschop et al. | ............ | 417/410.1 |
| 5,529,467 A * | 6/1996 | Rometsch | ....................... | 417/534 |
| 5,658,134 A * | 8/1997 | Gagnon et al. | ................ | 417/262 |
| 5,683,234 A * | 11/1997 | Chuang et al. | ................ | 417/531 |
| 5,724,843 A * | 3/1998 | Kirii et al. | ...................... | 72/17.2 |
| 5,762,480 A * | 6/1998 | Adahan | ........................... | 417/415 |
| 5,879,145 A * | 3/1999 | Baumgartner | ................. | 417/524 |
| 5,976,184 A * | 11/1999 | Buecherl et al. | .............. | 623/3.18 |
| 5,997,256 A * | 12/1999 | Gunther | ......................... | 417/259 |

(Continued)

FOREIGN PATENT DOCUMENTS

EP    1 437 507    7/2004

(Continued)

*Primary Examiner* — Devon Kramer
*Assistant Examiner* — Bryan Lettman
(74) *Attorney, Agent, or Firm* — Miller, Matthias & Hull LLP

(57) ABSTRACT

Piston assemblies for rocking piston compressors, diaphragm compressors and vacuum pumps wherein the overall mass of each piston assembly is identical to that of the other assembly despite having rod tops, retainers and diaphragms of different diameters and therefore different capacities. Each piston assembly includes a connecting rod connected to a rod top that supports a cup seal and a retainer or retainer plate. The mass of each rod is equal to that of the other rod despite the differing geometries. The mass of each retainer is the same as that of the other retainer despite the differing geometries. The overall length and stroke length of each piston assembly is the same. As a result, centers of gravity of the piston assemblies are continuously balanced on either side of the drive shaft in terms of distance from the drive shaft and in absolute value.

13 Claims, 2 Drawing Sheets

U.S. PATENT DOCUMENTS

| | | | |
|---|---|---|---|
| 6,234,774 B1 * | 5/2001 | Siviero | 417/534 |
| 6,279,421 B1 | 8/2001 | Faulkner et al. | |
| 6,299,413 B1 * | 10/2001 | Stahlman et al. | 417/53 |
| 6,431,845 B1 | 8/2002 | Thomas et al. | |
| 6,485,266 B2 * | 11/2002 | DeRuyter | 417/201 |
| 6,527,524 B2 * | 3/2003 | Cook | 417/454 |
| 6,533,560 B2 * | 3/2003 | Ohya et al. | 417/431 |
| 6,609,896 B2 * | 8/2003 | Hix et al. | 417/221 |
| 6,776,587 B2 * | 8/2004 | Meyer et al. | 417/248 |
| 6,832,900 B2 | 12/2004 | Leu | |
| 7,037,090 B2 | 5/2006 | Leu | |
| D532,796 S | 11/2006 | Leu | |
| 7,390,175 B2 * | 6/2008 | Maki et al. | 417/568 |
| 2001/0036410 A1 * | 11/2001 | DeRuyter | 417/201 |
| 2002/0141890 A1 * | 10/2002 | Chou | 417/415 |
| 2003/0031572 A1 * | 2/2003 | Tearle | 417/534 |
| 2003/0031573 A1 * | 2/2003 | Tearle | 417/534 |
| 2003/0039565 A1 * | 2/2003 | Ikuta | 417/466 |
| 2004/0131489 A1 * | 7/2004 | Leu et al. | 417/569 |
| 2005/0152798 A1 * | 7/2005 | Kreuter et al. | 417/534 |
| 2006/0110276 A1 * | 5/2006 | Djordjevic et al. | 417/521 |
| 2006/0275160 A1 * | 12/2006 | Leu et al. | 417/415 |
| 2006/0275164 A1 * | 12/2006 | Ganser | 417/521 |
| 2008/0085201 A1 * | 4/2008 | Kabir et al. | 417/521 |
| 2008/0310969 A1 * | 12/2008 | Hogan | 417/53 |
| 2009/0016913 A1 * | 1/2009 | Smits | 417/415 |
| 2009/0016917 A1 * | 1/2009 | Smits | 417/539 |
| 2009/0068040 A1 * | 3/2009 | Mann et al. | 417/521 |

FOREIGN PATENT DOCUMENTS

| | | | |
|---|---|---|---|
| EP | 1437507 A2 | * | 7/2004 |
| JP | 52025908 A | * | 2/1977 |

* cited by examiner

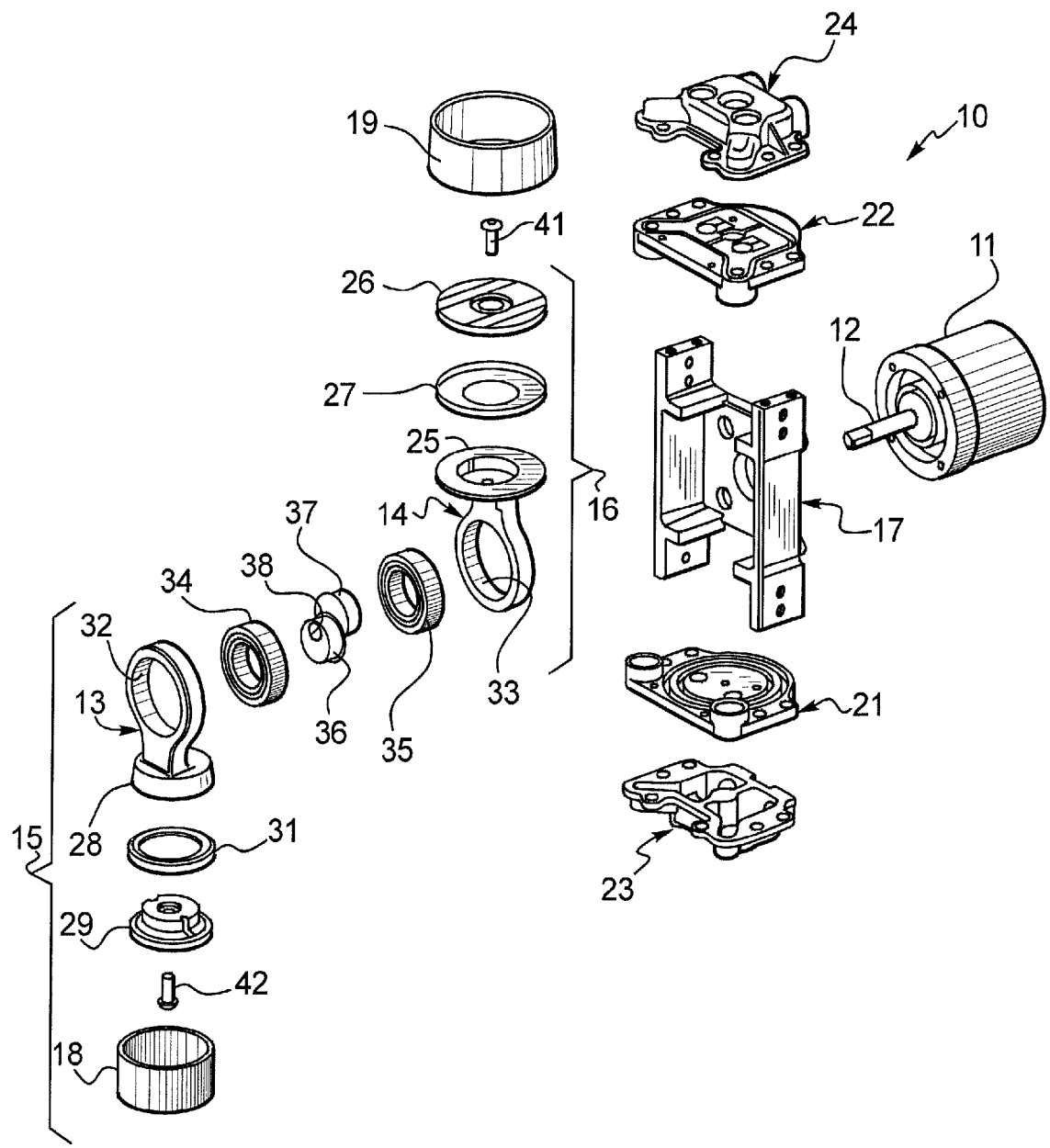

BALANCED DUAL ROCKING PISTON PUMPS

BACKGROUND

1. Technical Field

Improved dual rocking piston and diaphragm compressors as well as vacuum pumps are disclosed. More specifically, improved dual piston assemblies for use in rocking piston compressors, diaphragm compressors and vacuum pumps are disclosed. In one embodiment, improved balance is achieved by providing pistons with equal stroke lengths, piston heads and retainers with unequal diameters and piston assemblies with equal masses so that the moments of inertia and centers of gravity of each piston assembly are diametrically opposite the drive shaft from one another and cancel each other out for improved balance. In another embodiment, piston assemblies of different stroke lengths are used, and the forces of each piston assembly cancel each other out by adjusting the masses of the various components in consideration of the acceleration of each piston assembly.

2. Description of the Related Art

Dual rocking piston compressors, diaphragm compressors and vacuum pumps all use the reciprocating motion of a piston to produce increased pressures within a control volume, such as a cylinder. The length of the stroke of the piston determines the compression ratio for the fixed control volume. Dual rocking pumps are often used for medical applications, such as used in oxygen concentrators, because they are compact. Because a pump used in a medical application needs to be quiet for the comfort of the patient, it is important to reduce any vibration during operation of the pump.

One problem with conventional dual rocking piston pumps is that they can create noise and vibration as the pistons reciprocally stroke, especially if the two pistons are designed for different outputs, thereby leading to improper balancing. If each piston assembly produces a different output, different rod top/retainer/diaphragm diameters, forces of different magnitudes are imposed on the drive shaft by each piston assembly. Shaking or vibrations arise as the drive shaft rotates because of the imbalance in the forces imposed by each piston assembly.

Further, it is often desirable to design dual rocking piston pumps with unequal piston strokes. A dual opposed rocking piston pump with unequal strokes is also inherently out of balance. Because the strokes are different, the opposed reciprocating piston assemblies are traveling different distances during each revolution. As a result, the acceleration of one piston assembly is not equal to the acceleration of the other piston assembly. The diameters of the retainers, rod tops or diaphragms may or may not be equal and the mass of the opposed reciprocating components may or may not be equal. The force created by each reciprocating components is a function of mass and acceleration (Force=Mass·Acceleration). If the product of the mass and acceleration of the opposed reciprocating components is not equal a shaking or vibrating force will be created resulting in unwanted noise and vibration.

As a result, there is a need for an improved rocking piston pump or compressor with improved balance and quieter operation without requiring identical piston assemblies or identical output of the piston assemblies.

SUMMARY OF THE DISCLOSURE

In satisfaction of the aforenoted needs, in a first embodiment, a dual rocking piston pump is disclosed that comprises a first piston assembly comprising a first connecting rod eccentrically mounted to a drive shaft. The first connecting rod is connected to a first rod top that is coupled to a first retainer that has a first diameter. The pump further comprises second piston assembly comprises a second connecting rod eccentrically mounted to the drive shaft in substantially equal opposition to the first piston assembly. The second connecting rod is connected to a second rod top that is coupled to a second retainer that a second diameter that is different than the first diameter of the first retainer. Thus, the capacities of each piston assembly are different. To balance the pump, the first and second connecting rods have substantially identical masses, and the first and second retainers have substantially identical masses. As a result, moments of inertia acting on the drive shaft from the first and second piston assemblies as the pump operates are essentially in equilibrium.

In a refinement of the first embodiment, the first and second retainers are coupled to the first and second rod tops respectively so that a first center of gravity of the first piston assembly is disposed on a first side of the drive shaft by a first distance and a second center of gravity for the second piston assembly is disposed on a second side of the drive shaft by a second distance. Further, the first and second distances are substantially continuously diametrically opposite the drive shaft are substantially equal in absolute value and are therefore in equilibrium as the pump operates.

In a refinement of the first embodiment, first and second cup seals are sandwiched between the first and second retainers and the first and second rod tops respectively.

In another refinement of the first embodiment, stroke lengths of the first and second piston assemblies are substantially equal.

In another refinement of the first embodiment, the first and second connecting rods comprise first and second openings respectively which accommodate first and second bearings. In such a refinement, the drive shaft passes through the first and second bearings, and the first and second bearings have masses that are substantially equal.

In another refinement of the first embodiment, the first bearing accommodates a first eccentric element and the second bearing accommodates a second eccentric element. In such a refinement, the first and second eccentric elements are mounted on the drive shaft, and the first and second eccentric elements have masses that are substantially equal.

In another refinement of the first embodiment, the first and second eccentric elements are fixedly connected together.

A piston and drive shaft assembly for a dual rocking pump like the first described above is also disclosed, which comprises first and second pistons, each having a head and a connecting rod. The heads of the first and second pistons have different diameters and the masses of the first and second pistons are substantially equal. The first and second pistons each have overall lengths that are substantially equal thereby providing substantially equal stroke lengths for each piston. The piston heads are coupled to first and second retainers, which have different diameters. However, the masses of the first and second retainers are substantially equal to essentially equalize the total mass of each piston assembly.

In a second embodiment, a disclosed dual rocking piston pump or compressor with unequal strokes comprises a first piston assembly that comprises a first piston comprising a first connecting rod comprises a first rod top. The first connecting rod is eccentrically mounted to a drive shaft. The first rod top is coupled to a first retainer. A second piston assembly comprises a second piston comprising a second connecting rod connected to a second rod top. The second connecting rod is eccentrically mounted to the drive shaft in substantially equal opposition to the first piston assembly. The second rod top is coupled to a second retainer. The first and second piston assemblies have unequal stroke lengths. The first and second connecting rods have different masses and the first and second retainers have different masses. To balance the pump, a product of an acceleration of the first piston assembly and the combined masses of the first retainer and the first piston is substantially equal to a product of an acceleration of the second piston assembly and combined masses of the second retainer and the second piston according to the equation:

$$(M_{retainer1}+M_{piston1}) \cdot A_{side1}=(M_{retainer2}+M_{piston2}) \cdot A_{side2}.$$

In a refinement of the second embodiment, moments of inertia acting on the drive shaft from the first and second piston assemblies are essentially in equilibrium.

In another refinement of the second embodiment, the first rod top has a first diameter and the second rod top has a second diameter that is different than the first diameter.

In another refinement of the second embodiment, the first and second cup seals are sandwiched between the first and second retainers and the first and second rod tops respectively.

In another refinement of the second embodiment, the first and second connecting rods comprise first and second openings respectively which accommodate first and second bearings. The drive shaft passes through the first and second bearings and the first and second bearings have masses that are substantially equal.

In another refinement of the second embodiment, the first bearing accommodates a first eccentric element and the second bearing accommodates a second eccentric element. The first and second eccentric elements are eccentrically mounted on the drive shaft and the first and second eccentric elements having masses that are substantially equal.

In another refinement of the second embodiment, the first and second eccentric elements are fixedly connected together.

In another refinement of the second embodiment, moments acting on a shaft passing through the through bores from the piston assemblies are essentially in equilibrium.

In another refinement of the second embodiment, a first center of gravity of the first piston assembly is disposed on a first side of the drive shaft by a first distance and a second center of gravity for the second piston assembly is disposed on a second side of the drive shaft by a second distance and wherein the first and second distances are substantially continuously diametrically opposite the drive shaft are substantially equal in absolute value.

In a third embodiment, a pump is disclosed which comprises a motor having a drive shaft and a pump bracket that houses the drive shaft and pair of cylinders. The pump comprises two piston assemblies, each including rod with a rod top disposed in one of the cylinders and the rod extends from its rod top to an opening that accommodates the drive shaft. The rod tops have different diameters but the mass of each rod is substantially equal. Further, an overall length of each piston is substantially equal and therefore the stroke lengths for each rod assembly are substantially equal. The pump further comprises two retainers, one coupled to each rod top. The retainers have different diameters but substantially equal masses thereby substantially equalizing the total mass of each piston assembly.

In a refinement of the third embodiment, the retainers are coupled to the rod tops so that the center of gravity is at essentially the same location of each piston assembly.

In another refinement of the third embodiment, moments of inertia acting on the drive shaft from the piston assemblies are essentially in equilibrium.

Other advantages and features will be apparent from the following detailed description when read in conjunction with the attached drawings.

BRIEF DESCRIPTION OF THE DRAWINGS

For a more complete understanding of the disclosed methods and apparatuses, reference should not be made to the embodiment illustrated in greater detail on the accompanying drawings, wherein:

FIG. 5 is an exploded view of the compressor shown in FIGS. 1 and 3-4.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
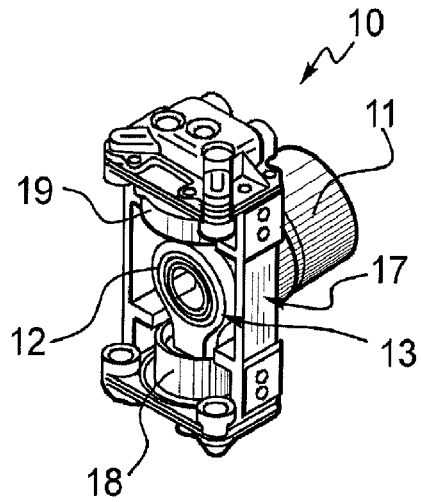
FIG. 1 is a perspective view of a dual rocking piston pump or compressor made in accordance with this disclosure.

Turning first to FIG. 1, a dual rocking piston compressor or pump 10 is shown that includes a motor 11 connected to a drive shaft 12. The drive shaft 12 passes through the connecting rods 13, 14 of the assemblies 15, 16 which is more easily seen in FIGS. 2-3 as only the rod 13 can be seen in FIG. 1. The motor 11 is mounted to a bracket 17 which houses the piston assemblies 15, 16 and associated cylinders 18, 19. The bracket 17 is also connected to valve plates 21, 22 and heads 23, 24 (see also FIG. 5).

Figure 2:
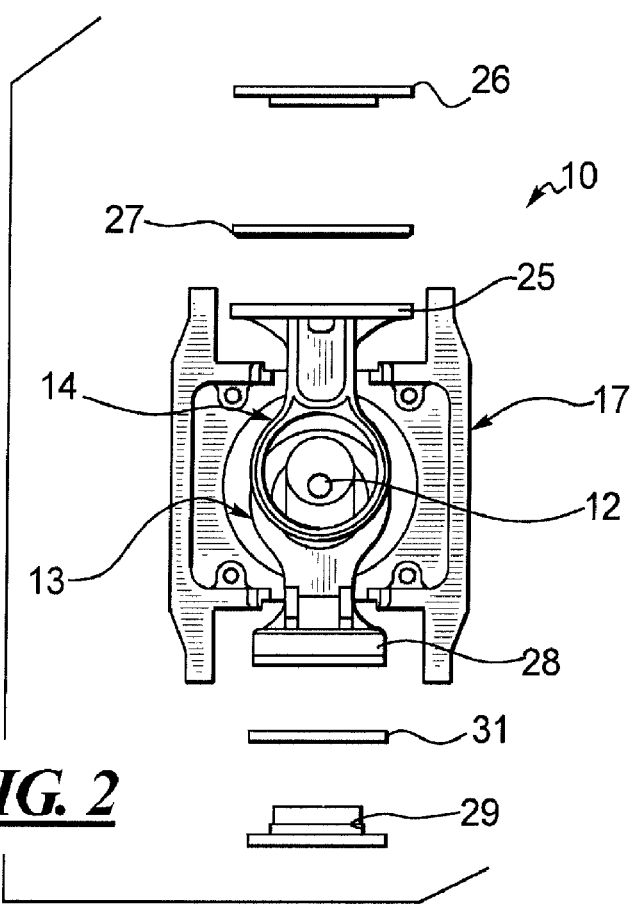
FIG. 2 is an exploded schematic view of the compressor shown in FIG. 1.
Figure 3:
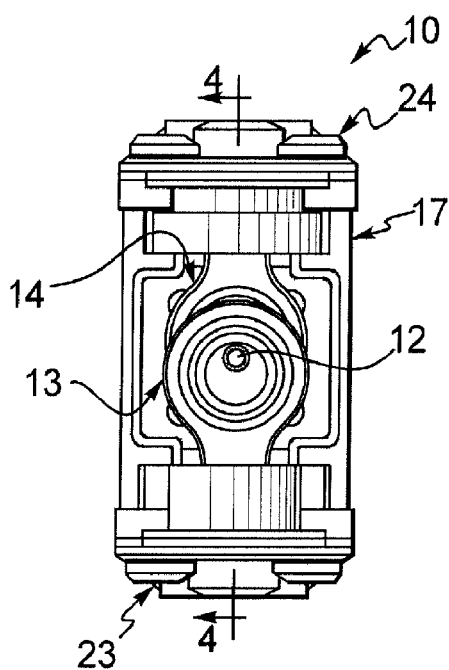
FIG. 3 is a plain view of the compressor shown in FIG. 1.
Figure 4:
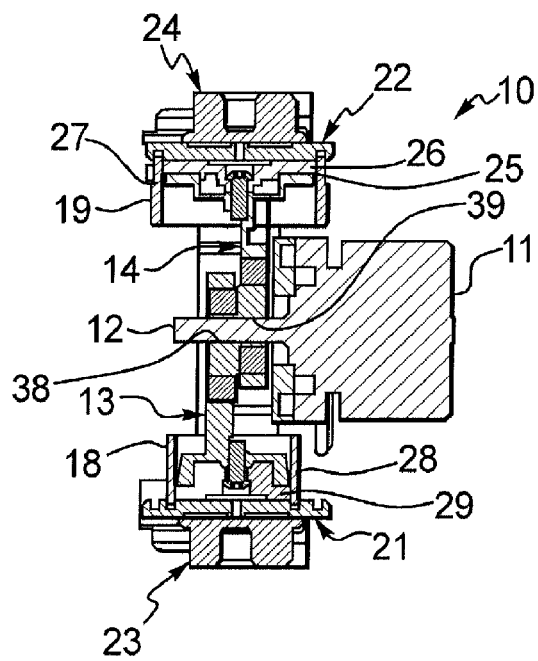
FIG. 4 is a sectional view taken substantially along line 4-4 of FIG. 3.

As best seen in FIGS. 2 and 4, the rod 14 includes a top 25 that is connected to a retainer 26 with a seal cup 27 sandwiched between the rod top 25 and retainer 26. Similarly, with respect to the rod 13, the rod 13 includes a top 28 that is connected to a retainer 29 with a seal cup 31 sandwiched between the top 28 and retainer 29.

As best seen in FIG. 2, the top 25 of the rod 14 is substantially wider than the top 28 of the rod 13. Consequently, retainers 26 and 29 have different diameters. The retainer 26 is larger in diameter than the retainer 29 and the seal cup 27 being larger and diameter than the seal cup 31. Accordingly, the cylinders 18 and 19 are sized accordingly with the cylinder 18 have a smaller diameter than the cylinder 19.

Ordinarily, the overall mass of the rod 13 would be smaller than the overall mass of the rod 4 if only the diameters of the tops 28, 25 are different. However, the disclosed pump 10 includes the rod 13 having the same mass as the rod 14. Accordingly, to maintain a balance between the rods 13 and 14, the retainers 26 and 29 also have equal masses. Preferably, to maintain an accurate balance, the masses of the seal cups 27, 31 are taken into consideration when balancing out the masses of the entire piston assemblies 15, 16 which include the rods 13, 14, the retainers 26, 29 and the seal cups 27, 31 as shown in FIG. 5. In this way, opposing moments of inertia on opposite sides of the drive shaft 12, counteract and balance out each other.

As best seen in FIG. 5, the connecting rods 13, 14 includes an opening 32, 33. The openings 32, 33 accommodate bearings 34, 35 respectively. In turn, the bearings 34, 35 each accommodate an eccentric member 36, 37. In the embodiment shown in FIG. 5, the eccentric members 36, 37 are fixably connected together and include eccentrically aligned boreholes 38, 39 (see also FIG. 4) through which the drive shaft 12 passes. To further keep the pump 10 in balance, the masses of the bearings 34, 35 and eccentric members 36, 37 can also be equalized. The retainers or mass members 26-29 are mounted to the respective rod tops 25, 28 by fasteners 41, 42 as shown in FIG. 5.

According to a second embodiment, a twin opposed rocking piston pump is disclosed where the primary reciprocating masses are the rods 13, 14 and retainers 29, 26. The force created by the mass and the acceleration of the reciprocating components shown as the piston assembly 15 in FIG. 5 is $F_{15}=(M_{retainer29}+M_{rod13}) \cdot A_{piston-assy15}$ while the force created by the mass and the acceleration of the reciprocating components shown as the piston assembly 16 in FIG. 5 is $F_{16}=(M_{retainer26}+M_{rod14}) \cdot A_{piston-assy16}$. Using the concepts disclosed herein, balance is achieved for a twin opposed rocking piston pump with unequal strokes by manufacturing the reciprocating components so that the product of the mass and acceleration of the first piston assembly 16 is equal to the product of the mass and acceleration of the second piston assembly 15. The mass of the rods 13, 14 and retainers 29, 26 will be designed so that $(M_{retainer29}+M_{rod13}) \cdot A_{piston-assy15} = (M_{retainer26}+M_{rod14}) \cdot A_{piston-assy16}$. The acceleration of one side ($A_{piston-assy15}$) is not equal to the acceleration of the other side ($A_{piston-assy16}$) because the stroke length of the rod 13 is not equal to the stroke length of the rod 14. The masses of the rods 13, 14 and retainers 29, 26 will be adjusted to compensate for difference in accelerations in order to equate the forces on each side of the pump 10.

While only certain embodiments have been set forth, alternatives and modifications will be apparent from the above description to those skilled in the art. These and other alternatives are considered equivalents and within the spirit and scope of this disclosure and the appended claims.

What is claimed:

1. A dual rocking piston pump consisting of:
   a first piston assembly comprising a first connecting rod eccentrically mounted to a drive shaft, the first connecting rod comprising a first rod top coupled to a first retainer, the first rod top and first retainer having a first diameter,
   a second piston assembly comprising a second connecting rod eccentrically mounted to the drive shaft in equal opposition to the first piston assembly, the second connecting rod comprising a second rod top coupled to a second retainer, the second rod top and the second retainer having a second diameter that is different than the first diameter,
   the first and second connecting rods having identical masses despite a difference in the first and second diameters,
   the first and second retainers having identical masses despite the difference in the first and second diameters,
   wherein moments acting on the drive shaft from the first and second piston assemblies are in equilibrium without coupling inertia-increasing or inertia-decreasing elements to the drive shaft other than the piston assemblies,
   the first and second connecting rods comprise first and second openings respectively which accommodate first and second bearings, the drive shaft passing through the first and second bearings, the first and second bearings having masses that are equal,
   the first bearing accommodates a first eccentric element and the second bearing accommodates a second eccentric element, the first and second eccentric elements being mounted directly on the drive shaft, the first and second eccentric elements having masses that are equal and
   the first and second eccentric elements are unitary in structure.

2. The pump of claim 1 wherein the first and second retainers are coupled to the first and second rod tops respectively so that a first center of gravity of the first piston assembly is disposed on a first side of the drive shaft by a first distance and a second center of gravity for the second piston assembly is disposed on a second side of the drive shaft by a second distance and wherein the first and second distances are continuously diametrically opposite each other relative to the drive shaft and are equal in absolute value.

3. The pump of claim 1 wherein first and second cup seals are sandwiched between the first and second retainers and the first and second rod tops respectively.

4. The pump of claim 3 wherein the first retainer and first cup seal have a cumulative mass equal to that of the second retainer and second cup seal.

5. The pump of claim 1 wherein stroke lengths of the first and second piston assemblies are equal.

6. A dual rocking piston pump consisting of:
   a first piston assembly comprising a first connecting rod comprising a first rod top, the first connecting rod eccentrically mounted to a straight drive shaft, the first rod top coupled to a first retainer and having a first diameter,
   a second piston assembly comprising a second connecting rod comprising a second rod top, the second connecting rod eccentrically mounted to the drive shaft in equal opposition to the first piston assembly, the second rod top coupled to a second retainer, and having a second diameter, the second diameter different from the first diameter,
   the first and second piston assemblies having unequal stroke lengths,
   the first and second connecting rods having different masses,
   the first and second retainers having different masses,
   wherein a product of an acceleration of the first piston assembly and combined masses of the first retainer and the first connecting rod is equal to a product of an acceleration of the second piston assembly and combined masses of the second retainer and the second connecting rod according to the equation $$(M_{retainer1}+M_{rod1}) \cdot A_{side1} = (M_{retainer2}+M_{rod2}) \cdot A_{side2}$$

without coupling inertia-increasing or inertia-decreasing elements to the drive shaft other than the piston assemblies, wherein $A_{side1}$ is not equal to $A_{side2}$
   the first and second connecting rods comprise first and second openings respectively which accommodate first and second bearings, the drive shaft passing through the first and second bearings, the first and second bearings having masses that are equal,
   the first bearing accommodates a first eccentric element and the second bearing accommodates a second eccentric element, the first and second eccentric elements being mounted directly on the drive shaft, the first and second eccentric elements having masses that are equal and the first and second eccentric elements are unitary in structure.

7. The pump of claim 6 wherein first and second cup seals are sandwiched between the first and second retainers and the first and second rod tops respectively.

8. The pump of claim 7 wherein a cumulative mass of the first cup seal and first retainer is equal to that of the second retainer and the second cup seal.

9. The assembly of claim 6 wherein moments acting on the drive shaft passing through aligned boreholes in the piston assemblies are in equilibrium.

10. The pump of claim 6 wherein a first center of gravity of the first piston assembly is disposed on a first side of the drive shaft by a first distance and a second center of gravity for the second piston assembly is disposed on a second side of the drive shaft by a second distance and wherein the first and second distances are continuously diametrically opposite each other relative to the drive and shaft are equal in absolute value.

11. A pump consisting of:
a motor having a drive shaft;
a pump bracket housing the drive shaft and a pair of cylinders;
two piston assemblies including two connecting rods each having a rod top disposed in one of the cylinders and coupled to a retainer, each connecting rod coupled to the drive shaft, the rod top of each connecting rod having a different diameter from the other rod top, but the connecting rods have identical masses despite having different diameters;
the two retainers having different diameters and identical masses despite having different diameters; and
the retainers are coupled to the piston assemblies respectively so that a first center of gravity of the first piston assembly is disposed on a first side of the drive shaft by a first distance and a second center of gravity for the second piston assembly is disposed on a second side of the drive shaft by a second distance and wherein the first and second distances are continuously diametrically opposite each other relative to the drive shaft such that the first and second centers of gravity are equal in absolute value without coupling inertia-increasing or inertia-decreasing elements to the drive shaft other than the piston assemblies,
the first and second connecting rods comprise first and second openings respectively which accommodate first and second bearings, the drive shaft passing through the first and second bearings, the first and second bearings having masses that are equal,
the first bearing accommodates a first eccentric element and the second bearing accommodates a second eccentric element, the first and second eccentric elements being mounted directly on the drive shaft, the first and second eccentric elements having masses that are substantially equal and
the first and second eccentric elements are unitary in structure.

12. The pump of claim 11 wherein moments acting on the drive shaft from the piston assemblies are in equilibrium.

13. The pump of claim 11 wherein a product of an acceleration of the first piston assembly and combined masses of the first retainer and the first connecting rod is equal to a product of an acceleration of the second piston assembly and combined masses of the second retainer and the second connecting rod according to the equation $$(M_{retainer1}+M_{rod1})\cdot A_{side1}=(M_{retainer2}+M_{rod2})\cdot A_{side2}.$$

* * * * *